United States Patent [19]

Sumi et al.

[11] Patent Number: 4,888,083
[45] Date of Patent: Dec. 19, 1989

[54] LAMINATOR

[75] Inventors: Sigeo Sumi; Fumio Hamamura, both of Saitama; Ichio Fukuda, Tokyo, all of Japan

[73] Assignee: Somar Corporation, Tokyo, Japan

[21] Appl. No.: 155,453

[22] Filed: Feb. 12, 1988

[30] Foreign Application Priority Data

Feb. 12, 1987 [JP] Japan .................................. 62-30294

[51] Int. Cl.$^4$ .............................................. B32B 31/18
[52] U.S. Cl. ..................................... 156/521; 156/522; 83/487; 83/488; 83/489
[58] Field of Search ............... 156/521, 522, 555; 83/483, 485, 487, 488, 489, 578, 614, 639, 758, 780, 578

[56] References Cited

U.S. PATENT DOCUMENTS

| | | | |
|---|---|---|---|
| 1,161,773 | 11/1915 | Johnson et al. | 83/489 |
| 2,626,665 | 1/1953 | Chamberlain | 83/489 |
| 3,173,324 | 3/1965 | Pass | 83/488 |
| 3,937,092 | 2/1976 | Hawkins | 118/323 |
| 4,012,974 | 3/1977 | Reinmold | 83/487 |
| 4,585,509 | 4/1986 | Obayashi | 156/521 |
| 4,659,419 | 4/1987 | Miyake | 156/522 |
| 4,717,441 | 1/1988 | Seki et al. | 156/521 |
| 4,759,809 | 7/1988 | Matsuo et al. | 166/256 |

*Primary Examiner*—Caleb Weston
*Attorney, Agent, or Firm*—Sughrue, Mion, Zinn, Macpeak and Seas

[57] ABSTRACT

A laminator is disclosed in which a cutter unit is provided so that a cutter is moved across the direction of feed of a continuous thin film to cut off the film to a prescribed size and the film cut off by the cutter unit is laminated on a substrate. A shock absorber for absorbing a shock which takes place when the movement of the cutter of the cutter unit is stopped is provided at a prescribed portion near the stopped position of said cutter or near the prescribed portion of the body of said laminator.

5 Claims, 8 Drawing Sheets

LAMINATOR

BACKGROUND OF THE INVENTION

The present invention relates to an art of laminating a thin film, and particularly relates to an art effectively applicable to a lamination art in which a cutter is moved across the direction of feed of a continuous thin film so that the thin film is cut off to a prescribed size; and the thin film cut off to the prescribed size is laminated on a substrate.

Printed circuit boards used in electronic equipment such as a computers are formed by depositing a predetermined pattern of wires cf conductive materials such as copper on one or both sides of an insulating substrate.

Printed circuit boards of this type can be manufactured by the following process.

First, an assembly of a photosensitive resin layer (photoresist) and a transparent resin layer (protective film) is laminated over an electro-conductive layer on the insulating substrate by thermo-compression. This step is commercially carried out with a device called a laminator. Thereafter, a film with a wiring pattern is superposed on the assembly and the photosensitive resin layer is exposed to light for a predetermined period of time through the patterned film and the transparent resin film. Subsequently, the transparent resin film is stripped with a peeler and the exposed photosensitive resin layer is developed to form a mask pattern for etching.

A laminator, which is used in a process of manufacturing a printed circuit board, is constructed so as to automatically laminate a stacked assembly by heat and pressure.

A conventional laminator disclosed in U.S. Pat. No. 4,585,509 made by the present applicant performs lamination by heat and pressure as described from now on. A stacked assembly continuously wound on the feed roller of the laminator is fed to a substrate by using a main vacuum attraction or absorption plate which has a plurality of suctional attraction or absorption holes in the stacked assembly feed side of the main vacuum attraction plate so that the stacked assembly is attracted on the suctional attraction holes by suction and fed to the substrate. The leading edge of the stacked assembly fed to the substrate is tentatively stuck to an electroconductive layer on the electrically-insulating substrate by heat and pressure through the use of an arc-shaped tentative sticking portion provided at the downstream end of the main vacuum attraction plate with regard to the direction of feed of the stacked assembly The leading edge of the stacked assembly is attracted to the tentative sticking portion through the use of an auxiliary vacuum attraction plate which is moved toward and away from the passage for the feed of the stacked assembly The stacked assembly whose leading edge is tentatively stuck to the electroconductive layer on the electrically insulating substrate is laminated on the substrate by heat and pressure through the use of a heat and pressure sticking roller After the stacked assembly is laminated by a prescribed quantity on the substrate, the stacked assembly is cut off, by a cutter unit, to a prescribed size corresponding to the substrate. The cutter unit has a disk-shaped cutter which is moved across the direction of feed of the stacked assembly so as to cut off the stacked assembly The disk-shaped cutter is supported by a moving member coupled to the moving portion of an air cylinder of the rodless type The trailing edge of the stacked assembly is finally stuck to the substrate by the heat and pressure sticking rollers.

It is desired that the speed of the heat and pressure lamination of the stacked assembly by the above-mentioned conventional laminator is increased to enhance the printed circuit board production capacity of the laminator. In order to increase the speed of the heat and pressure lamination of the stacked assembly, the speed of the feed of the stacked assembly, that of the cutoff of the stacked assembly and that of the heat and pressure lamination of the stacked assembly need to be heightened. Since the cut-off position of the stacked assembly needs to be substantially put at a standstill in the direction of feed thereof when the cutter is moved to cut off the stacked assembly, the speed of the movement of the cutter is considerably increased. For that reason, the cutter unit is vibrated and the laminator is vibrated through the cutter unit when the cutter is halted in a stopped position after the stacked assembly is cut off by moving the cutter.

Conducting an experiment and studying the result thereof, the present inventors have found out that the above-mentioned vibration takes place because of the collision of the end of the moving portion of the air cylinder of the cutter unit against the inside end of the cylinder. Although air for moving the moving portion of the air cylinder is slightly left at the inside end of the air cylinder so as to act as a buffer to reduce the vibration, the collision of the moving portion against the inside end of the air cylinder cannot be prevented by the small amount of air in the air cylinder when the speed of the movement of the moving portion is increased, namely, when the speed of the movement of the cutter is increased. The vibration of the cutter unit or the laminator brings on a problem which is the loosening of the screw of a joint, the shortening of the life of the laminator, the increase in the labor for maintenance work or the like.

OBJECTS AND SUMMARY OF THE INVENTION

It is an object of the present invention to provide an art in which the vibration of the cutter unit of a laminator having the cutter unit for cutting off a thin film by moving a cutter or the vibration of the laminator is reduced.

It is another object of the present invention to provide an art in which the vibration of the cutter unit of a laminator having the cutter unit for cutting off a thin film by moving a cutter or the vibration of the laminator is reduced and the production capacity of laminating the thin film is enhanced.

It is still another object of the present invention to provide an art in which the vibration of the cutter unit of a laminator having the cutter unit for cutting off a thin film by moving a cutter or the vibration of the laminator is reduced, the production capacity of laminating the thin film is enhanced and the life of the cutter unit or the laminator is lengthened.

It is still another object of the present invention to provide an art in which the vibration of the cutter unit of a laminator having the cutter unit for cutting off a thin film by moving a cutter or the vibration of the laminator is reduced, the production capacity of laminating the thin film is enhanced, the life of the cutter unit or the laminator is lengthened and the maintenance work properties of the laminator are improved.

It is still another object of the present invention to provide an art in which the vibration of the cutter unit of a laminator having the cutter unit for cutting off a thin film by moving a cutter or the vibration of the laminator is reduced, the production capacity of laminating the thin film is enhanced, the life of the cutter unit or the laminator is lengthened, the maintenance work properties of the laminator are improved, the cut-off position of the thin film and the cutoff position of the cutter unit are exactly made coincident with each other and a support member fitted with a thin film feed member is driven by a driver of low driving capacity.

It is still another object of the present invention to provide an art in which the vibration of the cutter unit of a laminator having the cutter unit for cutting off a thin film by moving a cutter or the vibration of the laminator is reduced, the production capacity of laminating the thin film is enhanced, the life of the cutter unit or the laminator is lengthened, the maintenance work properties of the laminator are improved, the cut-off position of the thin film and the cutoff position of the cutter unit are exactly made coincident with each other, a support member fitted with a thin film feed member is driven by a driver of low driving capacity and the thin film is cut off to an exact size to enhance the yield in production.

The above-mentioned objects, other objects and novel features of the present invention will become apparent from the description hereinafter and the drawings attached hereto.

Typical one of the inventions in the present application is hereafter summarized.

According to the present invention, there is provided a laminator in which a cutter unit is provided so that a cutter is moved across the direction of feed of a continuous thin film to cut off said film to a prescribed size; and said film cut off by said cutter unit is laminated on a substrate, characterized in that a shock absorber for absorbing a shock which takes place when the movement of said cutter of said cutter unit is stopped is provided at a prescribed portion near the stopped position of said cutter or near the prescribed portion of the body of said laminator.

According to the invention, there is provided a laminator in which a cutter unit is provided so that a cutter is moved across the direction of feed of a continuous thin film to cut off said film to a prescribed size; and said film cut off to said size is laminated on a substrate, characterized in that a thin film feed member for feeding said continuous thin film to said substrate is attached to a support member; said support member is provided on the body of said laminator so as to be moved toward and away from said substrate; a thin film retaining member for retaining the cut-off portion of said film in a thin film feed passage is provided on said support member; said cutter unit, which functions so that said continuous thin film retained by said thin film retaining member is cut off to said prescribed size, is secured to the body of said laminator near said thin film feed passage between said thin film feed member and said substrate; and a shock absorber for absorbing a shock which takes place when the movement of said cutter of said cutter unit is stopped is provided at a prescribed portion near the stopped position of said cutter or at the prescribed portion of the body of said laminator.

According to the present invention, a shock which takes place when the movement of the cutter of the cutter unit is stopped is absorbed through the above-described constitution so that the vibration of the cutter unit or the laminator is reduced. As a result, the speed of the cutoff of the thin film by the laminator can be increased to enhance the production capacity thereof.

According to the present invention, the thin film feed member and the thin film retaining member are provided on the support member in the above-described constitution so that the cut-off position of the thin film is held by the thin film retaining member at the same time when the thin film is held by the thin film feed member. The thin film is cut off by the cutter unit as the thin film is held by the thin film feed member and the cut-off position of the thin film is held by the thin film retaining member. For these reasons, the thin film is prevented from becoming loose between the thin film feed member and the thin film retaining member, so that the cut-off position of the thin film and the cutoff position of the cutter unit are exactly made coincident with each other. Since the cutter unit is secured to the body of the laminator so that the weight of the support member is decreased, the support member can be driven by a driver of low driving capacity. Since the cut-off position of the thin film and the cutoff position of the cutter unit are exactly made coincident with each other, the thin film is cut off to an exact size so that the yield in production is enhanced.

DETAILED DESCRIPTION OF THE PREFERRED EMBODIMENTS

Embodiments of the present invention in which it is applied to a laminator for thermocompression laminating an assembly of a photosensitive resin layer and a transparent resin film onto a printed circuit board is hereinafter described specifically with reference to the accompanying drawings.

In the accompanying drawings, intended for illustrating the embodiment, components that achieve the same function are identified by the same numerals and redundant explanation of such components will be omitted.

Figure 1:
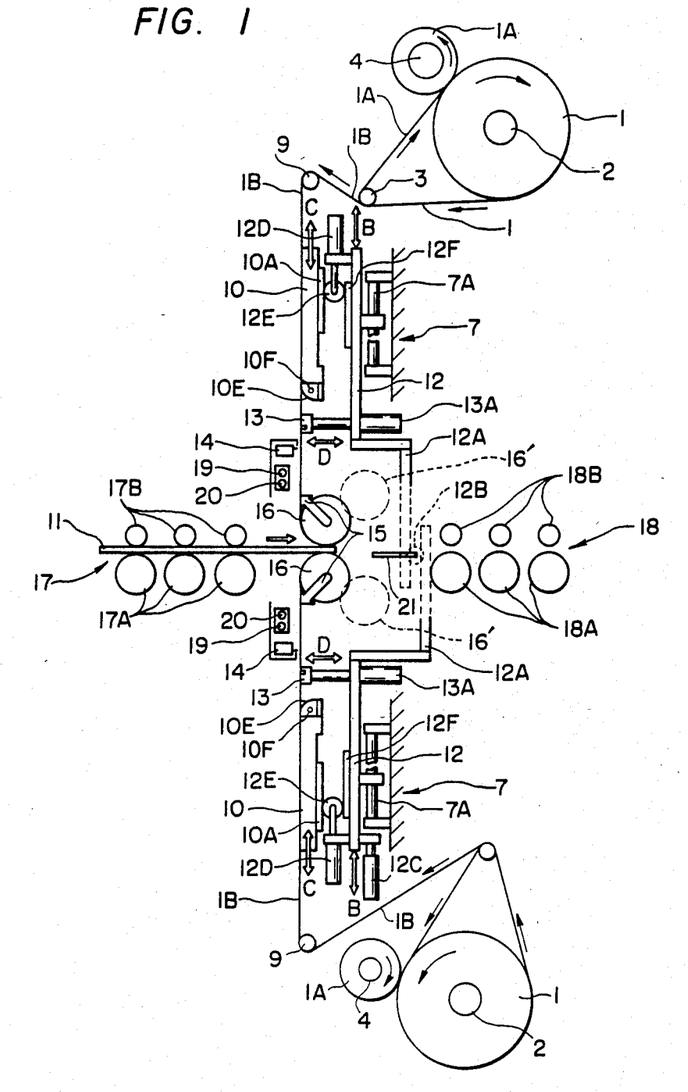
FIG. 1 is a schematic illustration showing laminator according to one embodiment of the present invention.

A laminator according to a first embodiment of the present invention is schematically shown in FIG. 1.

As shown in FIG. 1, an assembly 1 of three layers, i.e., a transparent resin film, a photosensitive resin layer, and another transparent resin film, is continuously wound around a feed roller 2 by which the assembly 1 is separated by a separation roller 3 into one transparent resin film (protective film) 1A and an assembly 1B composed of a photosensitive resin layer with its adhesive surface exposed and the other transparent resin film.

The transparent resin film 1A is wound onto a takeup roller 4.

The leading edge of the assembly 1B that has been separated from the protective film 1A by the separation roller 3 will pass on a tension roller 9 to be sucked onto a main vacuum plate 10.

The tension roller 9 is so designed that it will impart an appropriate amount of tension to the assembly 1B as it is supplied from the feed roller 2 to the main vacuum plate 10. In other words, the tension roller 9 serves to keep the assembly 1B taut without developing any surface detects such as wrinkles.

Figure 2:
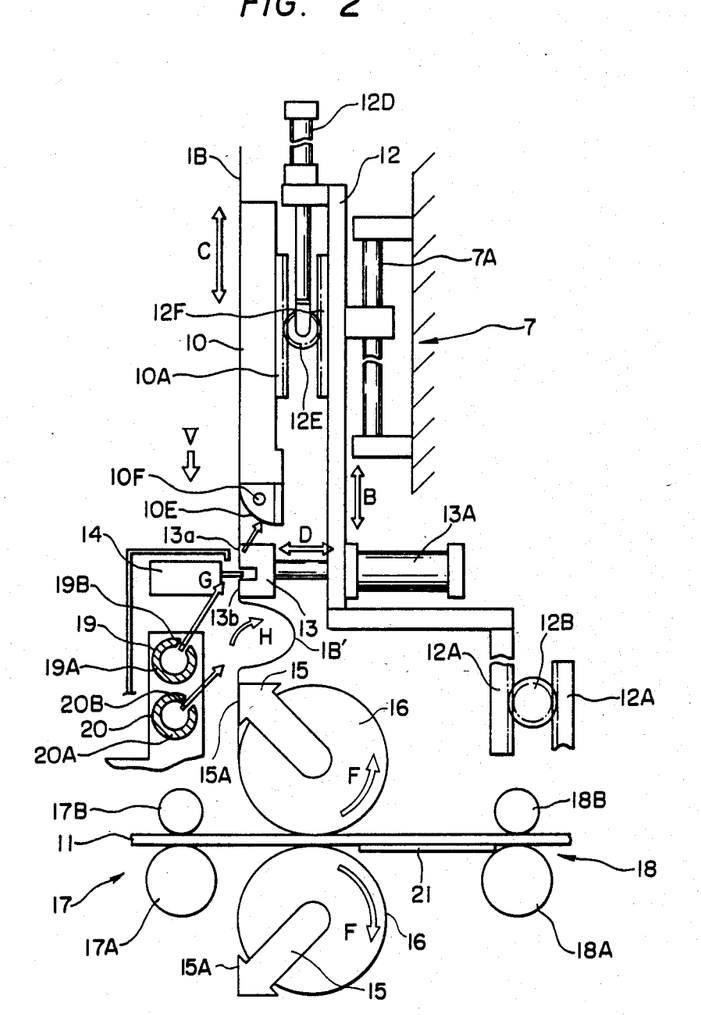
FIG. 2 is an enlarged view showing an essential portion of FIG. 1.

The main vacuum plate (film supply member) 10 is so designed that it allows the assembly 1B to be supplied from the roller 2 onto an electro-conductive layer (for example Cu layer) on the surface 3 of an insulating substrate 11. The main vacuum plate 10 is supported by a support member 12 that is movable toward or away from the insulating substrate 11 (viz., the support member 12 moves in the direction indicated by arrow B) as shown in FIGS. 1 and 2 (enlarged view showing an essential portion). The support member 12 is disposed in the laminator body 7 (housing of the laminator body) so as to allow the guide member 7A to be slidable in a direction shown by an arrow B. A pair of the support members 12 are provided, each one of the members being disposed at upper and lower sides with respect to the travelling path of the insulating substrate 11. The upper and lower supporting members 12 are moved in corporation by a rack and pinion mechanism, so that the members 12 are moved simultaneously (toward and away from each other). That is, the upper and lower supporting members 12 are respectively provided with a rack 12A and a pinion 12B engaged with the rack 12A. The supporting members 12 are operated by a drive source 12C disposed to the lower supporting member 12. The drive source 12C may be, for example, a pneumatic cylinder. Further, the drive source 12C can be provided by a hydraulic cylinder, an electro-magnetic cylinder, or a step motor and a power transmission mechanism which transmits displacement of the cylinder or motor.

The main vacuum plate 10 is disposed on the support member 12 so as to move toward and away from the insulation substrate 11 (in a direction shown by an arrow C). The main vacuum plate 10 is operated by a drive source 12D disposed to the support member 12 and a rack and pinion mechanism. The rack and pinion mechanism includes a pinion 12E disposed to the drive source 12D, a rack 12F disposed to the support member 12, and the rack 10A disposed to the main vacuum plate 10. The drive source 12D would be similar to the drive source 12C.

Figure 3:
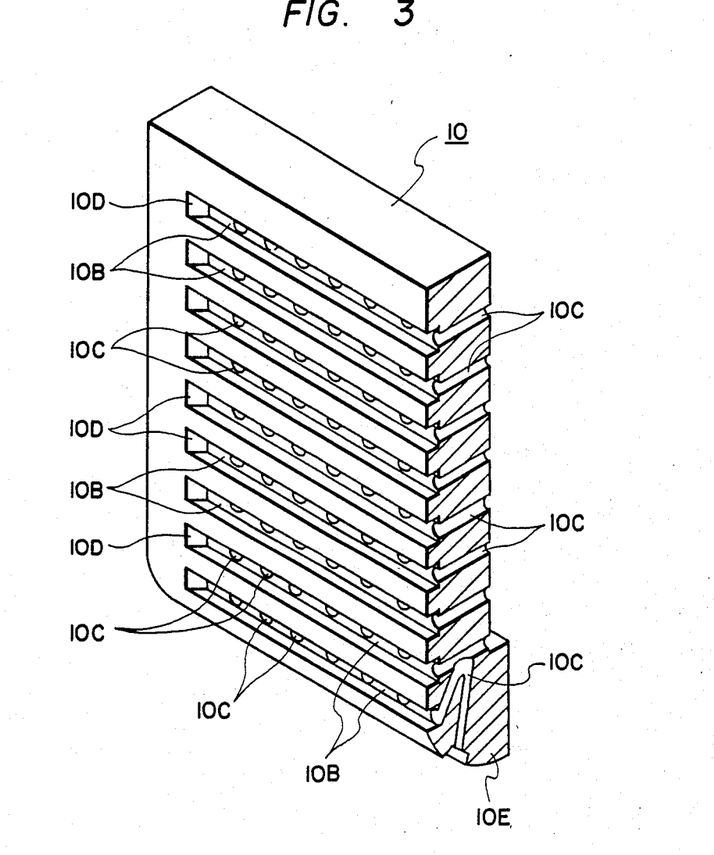
FIG. 3 is a perspective view partially in cross-section showing a main vacuum plate shown in FIGS. 1 and 2.

The main vacuum plate 10 shown in FIG. 3 (a perspective, partial section of the main vacuum plate 10) is provided with a plurality of grooves 10B that extend transversally in a direction generally orthogonal to the direction of supply of the assembly 1B and which are arranged in the direction in which the assembly 1B is conveyed. The length of each groove 10B as measured in the direction transversal to the direction in which the assembly 1B is supplied is generally the same as the dimension of the assembly 1B as measured in that transversal direction, so that the assembly 1B will cover each groove 10B. The bottom of each groove 10B is provided with a plurality of suction holes 10C by way of which the assembly 1B is to be sucked onto the main vacuum plate 10. Although not shown, each suction hole 10C is connected through an exhaust pipe to a vacuum source such as a vacuum pump. The suction operation of the main vacuum plate 10 and the suction operation of a temporary bonding portion 10E are controlled independently. Both ends 10D of each groove 10B are tapered from the margin of the mainvacuum plate 10 toward its center.

The downstream end of the main vacuum plate 10 as seen in the direction in which the assembly 1B is supplied is provided with a temporary thermo-compression bonding portion 10E that has an arc-shaped surface to which the assembly 1B is to be sucked. This bonding portion 10E is formed as an integral part of the main vacuum plate 10. As shown in FIGS. 1 and 2, a heater 10F is provided in the interior of the bonding portion 10E as a means for heating its arc-shaped portion. The bonding portion 10E is so constructed that by this area the leading edge of the assembly 1B being supplied on the main vacuum plate 10 is bonded temporarily to the substrate 11 (with heat and pressure).

In the present invention, the mainvacuum plate 10 and temporary bonding portion 10E may be formed as separate members which are individually mounted on the support member 12.

A sub-vacuum plate 13 (thin film retaining member) is provided in an area near the temporary bonding portion 10E, namely in the vicinity of the pathway of supply of assembly 1B between the bonding portion 10E and the substrate 11. Although not shown, the sub-vacuum plate 13 is also provided with suction holes and it is composed of an upper sucking portion 13a and a lower sucking portion 13b to provide a U-shaped form as shown in FIG. 2 (the U-shaped portion is positioned at a cutting position of the assembly 1B). The upper sucking portion 13a of the sub-vacuum plate 13 chiefly serves to have the leading edge of the assembly 1B sucked so that it is sucked (and retained) on the temporary bonding portion 10E. In order to enable the leading edge of the assembly 1B to be sucked onto the bonding portion 10E, the sub-vacuum plate 13 is mounted on the support member 12 and operated with a drive source 13A which may be in the form of an air cylinder that is movable toward or away from the pathway of the supply of assembly 1B (i.e., moved in the direction of arrow D).

The lower sucking portion 13b of the sub-vacuum plate 13 is so constructed that after a continuous form of assembly 1B has been cut with a cutting unit 14, the resulting segment of assembly is sucked at its trailing edge and retained within the pathway of the supply of assembly 1B. This lower sucking portion 13b is also constructed in such a way that after the start of thermo-compression lamination, as shown in FIG. 2, a slack will form in that portion of the assembly 1B which is situated between 13b and a rotary vacuum plate 15 (namely, a slack assembly 1B' can be formed by supplying the assembly 1B on the main vacuum plate 10 at a speed that is so controlled as to be faster than the peripheral speed of a thermo-compression roller 16 (viz., the speed of thermo-compression lamination). Although not shown, the speed at which the assembly is supplied on the main vacuum plate 10 and the peripheral speed of the roller 16 are controlled by a sequence control circuit.

As in the case of drive source 12C, the drive source 13A for sub-vacuum plate 13 may be in the form of a hydraulic cylinder or the like in place of an air cylinder.

The cutter unit 14 is fixedly provided in the laminator body 7 in an area near the pathway of the assembly 1B passing between the temporary bonding portion 10E and the insulating substrate 11 (in fact, between the temporary bonding station 10E and the rotary vacuum plate 15). Stated more specifically, the cutter unit 14 is disposed to face the sub-vacuum plate 13 with the trailing end of the assembly 1B being brought into a cutting position. The cutter unit 14 is disposed at the side of a front stage transferring device 17 which transfers the insulating substrate 11 (alternatively, the unit 14 is disposed on the device 17). The cutter unit 14 is so constructed that the assembly 1B which is continuously supplied on the main vacuum plate 10 is cut to a predetermined length in accordance with the dimensions of the substrate 11.

Figure 4:
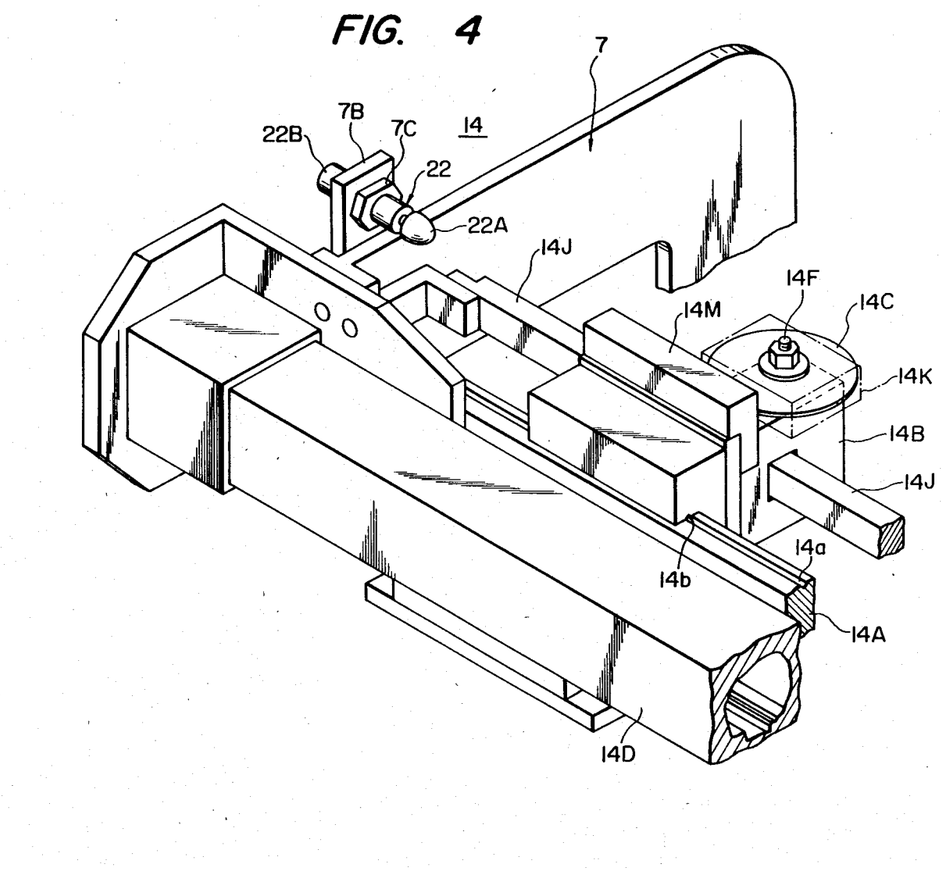
FIG. 4 is a schematic perspective view of a cutting means shown in FIGS. 1 and 2.
Figure 5:
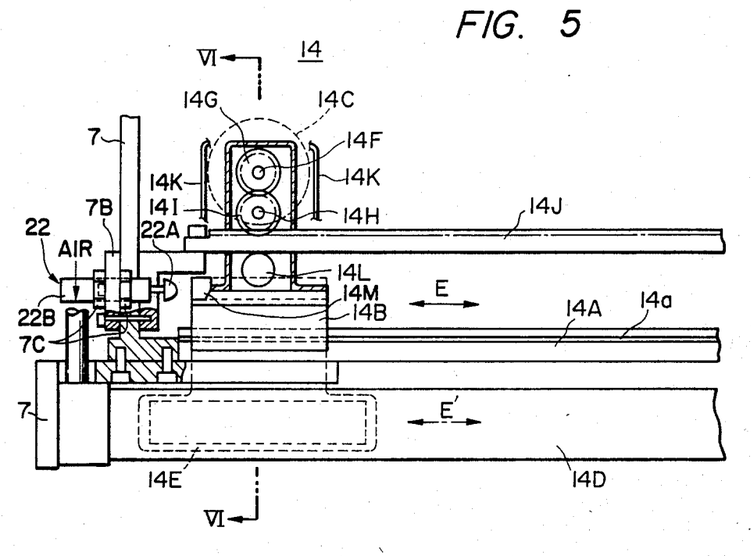
FIG. 5 is a schematic plan view as viewed from arrow V of FIG. 2.
Figure 6:
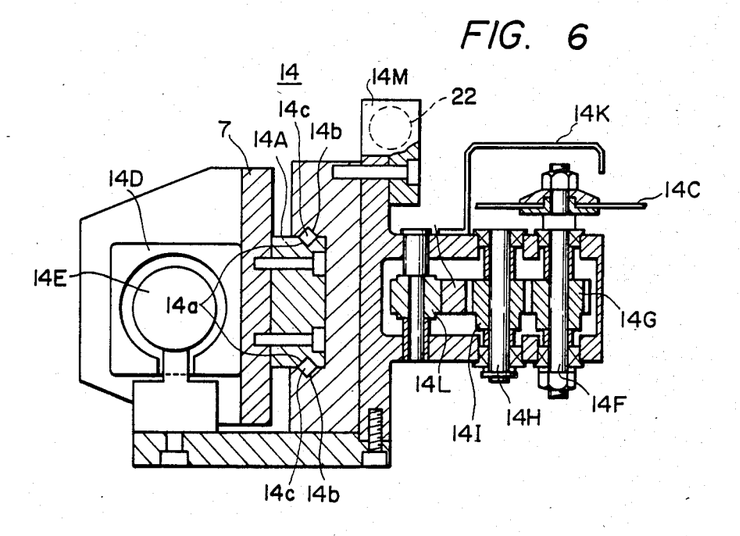
FIG. 6 is a cross-sectional view showing an essential portion taken along the line VI—VI in FIG. 5.

The construction of the cutter unit 14 is specifically shown in FIG. 4 (perspective view) and FIG. 5 (schematic plan view of this cutter unit looking in the direction of arrow V in FIG. 3, and in FIG. 6 which shows a section of the cutter unit as taken along line VI—VI in FIG. 5.

As is apparent from FIGS. 4 to 6, the cutter unit 14 is chiefly composed of a guide member 14A, a moving member 14B and a disk-shaped cutter 14C.

The guide member 14A extends transversal to the direction in which the assembly 1B is supplied and both ends (or one end) of the member 14A are secured to the laminator body 7 by fastening means such as screws, bolts, nuts and adhesives. In order to ensure correct movement of the moving member 14B, in the direction transversal to that of the supply of assembly 1B (i.e., the direction of an arrow E in FIG. 5), the guide member 14A is provided with recesses (or projections) 14a that engage correspondingly shaped projections (or recesses) 4b formed on the moving member 14B. Namely, the movement may be smoothed by the provision of cylindrical bearings the between the recesses 14a of the guide member 14A and the moving member 14B.

The moving member 14B is so constructed that it will slide along the guide member 14A in a direction shown by an arrow E. This moving member 14B is connected to a slider 14E that will move in the direction of arrow E′ within a hollow tube 14D that extends along the guide member 14A and which is supported at both ends to the laminator body 7. The slider 14E is in the form of a cylinder having a diameter smaller than an inside diameter of the hollow tube 14D and is provided with sealing members such as O-rings in order to come in intimate contact with the inner wall of the hollow wall 14D. The hollow tube 14D is so constructed that is automatically sealed except for the connecting portion between the slider 14E and the moving member 14B. Movement of the slider 14E is effected by blowing a fluid such as air into the hollow tube 14D (or drawing such a fluid from the tube), through either end thereof. In order words, the slider 14E will be moved from left to right in FIG. 5 when a fluid is blown into the hollow tube 14D from its left side, and will be moved in opposite direction when the fluid is blown from the right side. The slider 14E is so designed as to displace the moving member 14B by fluid. In place of air, a gas such as an inert gas or a liquid such as water or oil may be blown into the hollow tube 14D. Alternative means for effecting displacement of the moving member 14B include air cylinder, a hydraulic cylinder and a motor.

The disk-shaped cutter 14C is rotated as the moving member 14B is displaced and at least its periphery is provided with a blade for cutting the assembly 1B. The force to rotate the disk-shaped cutter 14C is imparted by the combination of a pinion 14G on an axis 14F and a gear wheel 14I on an axis 14H that meshes with a rack 14J. One or both ends of the rack 14J are secured to the laminator body 7 as shown in FIGS. 4 and 5 by fastening means such as screws bolts and nuts. The engagement between the rack 14J and the gear wheel 14I is stabilized by means of a retainer roller 14L that is mounted on the moving member 10B.

The disk-shaped cutter 14C is made of a metallic material such as a high-speed tool steel and at least the surface of the blade is coated with fluorine system resin such as polytetrafluoroethylene. Polytetrafluoroethylene is highly inert against chemicals and has superior heat stability; in addition, this resin has a small coefficient of friction and will not readily adhere to other materials. In laminators, repeated cutting of the assembly Lb will produce shavings that are composed of tiny particles and which contain various chemicals. If such shavings adhere to the blade of the disk-shaped cutter 14C, its cutting performance will be easily deteriorated. This problem can be effectively solved by coating a film of polytetrafluoroethylene on the blade surface.

The moving member 14B in the neighbourhood of the disk-shaped cutter 14C is provided with a protective cover 14K over the cutter 14C that is chiefly intended to ensure utmost safety for the operating personnel.

The cutting unit 14 described above is so constructed that in response to the sliding of the moving member 14B along the guide member 14A in one direction, the disk-shaped cutter 14C is rotated to cut the assembly 1B to a size that corresponds to the length of the insulating substrate 11. The assembly 1B can be reciprocatingly cut by moving the disk-shaped cutter 14C in one direction and this enables rapid cutting of the assembly 1B.

In the above-desicrbed laminator, the main vacuum plate 10 and the sub-vacuum plate 13 are mounted on the laminator body 7 via the support member 12 that is movable toward or away from the substrate 11, and the cutting unit 14 for cutting the assembly 1B is secured to the laminator body 7 in an area near the pathway of supply of the assembly 1B between the temporary bounding portion 10E and the substrate 11. This arrangement is effective in reducing the weight of the members 12 and thereby allowing the member 12 to be driven with the drive source 12C that may have a small driving capability (or capacity).

The above-described arrangement is also effective in reducing the numbers of mechanical parts that have to be supported by the support member 12 and thereby simplifying the layout of the support member 12 and associated components thereof so as to reduce the overall size of the laminator.

The reduction in the size of drive source 12C and other components offers the additional advantage of decreasing the production cost of the laminator.

As shown in FIGS. 4, 5 and 6, shock absorbers 22 are provided on the body 7 of a laminator near the position of the stoppage of the movement of the disk-shaped cutter 14C of a cutter unit 14, namely, near both the side edges of a stacked assembly 1B. Each of the shock absorbers 22 comprises a shock-absorbing movable portion 22A and a shock-absorbing secured portion 22B in the main. The shock-absorbing secured portion 22B is attached to the laminator body 7 with a support frame 7B and nuts 7C mounted by a securing means such as a screw. The shock-absorbing movable portion 22A is brought into contact with a contact member 14M secured to the moving member 14B of the cutter unit 14 by a securing means such as a screw and a bolt. The contact member 14M may be entirely made of a metal, and also may be entirely or partially made of a shock-absorbing elastic material such as plastic and rubber to more effectively absorb a shock and protect the contact portion of the contact member. The shock absorber 22 functions to absorb the shock which takes place when the movement of the disk-shaped cutter 14C is stopped. The shock absorber 22 is made of a fluid damper of the fluid viscosity type, a fluid damper of the fluid dynamic pressure type, an electromagnetic damper or the like. Gas such as air and inert gas or liquid such as water and oil, which is silicone oil, for example, is used as the fluid in the fluid damper of the fluid viscosity type and the fluid damper of the fluid dynamic pressure type. Since the shock absorber 22 for absorbing the shock at the time of the stoppage of the movement of the disk-shaped cutter 14C is provided in the laminator having the cutter unit 14, the vibration of the cutter unit or the body 7 of the laminator is reduced. As a result, the speed of the movement of the disk-shaped cutter 14C can be increased to heighten the speed of the cutoff of the stacked assembly 1B to enhance the production capacity of the laminator. Besides, the shock absorber 22 serves to lengthen the life of the cutter unit 14 or the laminator and improve the maintenance work properties of the laminator.

In the laminator, a mainvacuum attraction plate 10 and an auxiliary vacuum attraction plate 13 are provided on a support member 12. The support member 12 is provided on the body 7 of the laminator so as to be moved toward and away from an electrically insulating substrate 11. The cutter unit 14 for cutting off the stacked assembly 1B is secured to the laminator body 7 near the passage for the feed of the stacked assembly 1B between a tentative sticking portion 10E. Besides, the shock absorber 22 is provided. As a result, the weight carried by the support member 12 is reduced so that the support member can be driven by a driver 12C of low driving capacity, the vibration of the cutter unit 14 or the laminator body 7 is reduced and the production capacity of the laminator is enhanced.

Since the cutter unit 14 is secured to the body 7 of the laminator which is an embodiment of the present invention, the disk-shaped cutter 14C is moved after the cutoff portion of the stacked assembly 1B is substantially put at a standstill. For that reason, in order to increase the speed of the cutoff of the stacked assembly 1B, the speed of the movement of the disk-shaped cutter 14C needs to be considerably increased. Since the speed of the movement of the disk-shaped cutter 14C is considerably increased in reality, the considerably strong shock takes place when the movement of the diskshaped cutter 14C is stopped. Therefore, it is useful to provide the shock absorber 22, particularly for the laminator, to the body 7 of which the cutter unit 14 is secured.

Although the shock absorber 22 is provided on the laminator body 7 in the embodiment, the present invention is not confined thereto but may be otherwise embodied so that the shock absorber is provided on the outside of the moving member 14B of the cutter unit 14, which moves, or on the outside of the rack 14J, guide member 14A or hollow pipe 14D of the cutter unit, which is secured, for example.

The stacked assembly 1B, whose leading edge is tentatively stuck to an electroconductive layer on the electrically insulating substrate 11 by heat and pressure through the use of the tentative sticking portion 10E of the main vacuum attraction plate 10 shown in FIGS. 1 and 2, is entirely laminated on the electroconductive layer by heat and pressure through the use of a heat and pressure sticking roller 16. When the leading edge of the stacked assembly 1B is tentatively stuck to the electroconductive layer by the tentative sticking portion 10E, the heat and pressure sticking roller 16 is being rotated in a position shown by a dotted line 16' in FIG. 1 and is kept out of contact with the tentative sticking portion. After the tentative sticking is performed, the heat and pressure sticking roller 16 is moved from the position 16' to a position which is shown by a full line in FIG. 1 and in which the electrically insulating substrate 11 is pinched together with the stacked assembly 1B by the roller. The heat and pressure sticking roller 16 pinching the electrically insulating substrate 11 together with the stacked assembly is rotated in a direction F shown in FIG. 2, to laminate the stacked assembly 1B on the electroconductive layer on the electrically insulating substrate 11 and convey the substrate. The main and the auxiliary vacuum attraction plates 10 and 13 do not attract the stacked assembly 1B during the heat and pressure lamination of the stacked assembly by the roller 16. At that time, the stacked assembly 1B is automatically fed from a feed roller 2 to the heat and pressure sticking roller 16 by the turning force of the roller and the pinching force of the roller on the electrically insulating substrate 11.

The trailing edge of the stacked assembly 1B cut off by the cutter unit 14 is guided by a triangular-tipped rotary vacuum attraction plate 15 so that the trailing edge does not undergo a wrinkle or the like and is stuck to the electroconductive layer on the electrically insulating substrate 11 by heat and pressure through the use of the heat and pressure sticking roller 16. The rotary vacuum attraction plate 15 is supported by the same shaft as the heat and pressure sticking roller 16 and turned about the shaft. The rotary vacuum attraction plate 15 has a plurality of suctional attraction holes 15A (not shown in the drawings) in a suctional attraction side which faces the stacked assembly 1B and has the same constitution as the suctional attraction side of the main vacuum attraction plate 15 may also have suctional attraction holes. As a result, it is easier to make the stacked assembly loose as shown at 1B' in FIG. 2.

The electrically insulating substrate 11 is conveyed to a position for the tentative sticking of the stacked assembly B, on the laminator, by an anterior conveyor 17 comprising lower conveyance rollers 17A and upper conveyance rollers 17B. A posterior conveyor 18 comprising lower conveyance rollers 18A and upper conveyance rollers 18B functions so that the electrically insulating substrate 11 on which the stacked assembly 1B is already laminated by the heat and pressure sticking roller 16 is conveyed to a light exposure unit for making a wiring pattern.

A thin film adjusting unit 19 is provided as shown in FIGS. 1 and 2 on the laminator body 7 (or frontstage conveyor 17 or support member 12) in an area near the pathway (of thin film supply), or the pathway of the movement of the temporary bonding position 10E of the main vacuum plate 10. The adjusting unit 19 is so constructed that it will adjust the leading edge of the assembly 1B to be supplied in a direction G in which it will come into intimate contact with the temporary bonding portion 10E. The adjuster 19 is composed of a fluid conveying pipe 19A that extends transversely to the direction in which the assembly 1B is supplied and a plurality of fluid blowing holes 19B made in this pipe 19A.

The fluid conveying pipe 19A has a hollow interior and will permit the passage of a fluid therthrough at a pressure higher than atmospheric pressure. In the embodiment under discussion, the fluid conveying pipe 19A is shown to have a generally circular cross-section but the cross-sectional shape of this pipe is not limited to a circle and may be rectangular or elliptical.

The fluid blowing holes 19B are disposed in such a manner that a fluid will be blown against the assembly 1B in a direction that ensures proper adjustment of the assembly 1B (i.e., in the direction of arrow G in FIG. 4).

Air is typically used as a fluid in the film adjuster 19. Alternatively, gases such as inert gases or liquids such as water and oil may be used as fluids.

As shown in FIGS. 1 and 2, a thin film projecting unit 20 is mounted in the laminator body 7 (or front-stage conveyor 17 or support member 12) in an area near the assembly 1B (or 1B' that is supplied between the lower sucking portion 13b of the sub-vacuum plate 13 and the rotary vacuum plate 15. This projecting unit 20 is so constructed that it will form the slack assembly 1B' in a direction H in which it will be brought into intimate contact with the thermo-compression roller 16. The unit 20 is composed of a fluid conveying pipe 20A extending transversely to the direction in which the assembly 1B is supplied and a plurality of fluid blowing holes 20B made in this pipe 20A.

The fluid conveying pipe 20A has a hollow interior and will permit the passage of a fluid therethrough at a pressure higher than atmospheric pressure. The fluid conveying pipe 20A is shown to have a generally circular cross-section but the cross-sectional shape of this pipe is not limited to a circle and may be rectangular or elliptical.

The fluid blowing holes 20B are disposed in such a manner that fluid will be blown against the assembly 1B' in a direction in which its slack will protrude in the way already described above.

As in the case of thin film adjusting unit 19, air is typically used as a fluid in the film projecting unit 20. Alternatively, gases such as inert gases or liguids such as water and oil may be used as fluids.

In the present invention, the thin film adjusting unit 19 or thin film projecting unit 20 may be constructed of a plurality of fluid blowing nozzles that are provided transversely to the direction of the supply of assembly 1B and through which a fluid will be blown against the assembly 1B in such a manner that it will be adjusted or allowed to project in the appropriate direction defined in the preceding paragraph.

Alternatively, the adjusting unit 19 or projecting unit 20 may be constructed of a suction pipe extending transversely to the direction in which the assembly 1B is supplied and a plurarlity of suction holes that are made in this pipe and through which a vacuum is drawn to have the assembly 1B adjusted or project in the already defined appropriate direction.

If desired, each of the units 19 and 20 may be constructed of a projecting member that enables the assembly 1B to be adjusted or project in the specified appropriate direction. In the present invention, the film adjusting unit 19 may serve as the film projecting unit 20, or vice versa.

A substrate guide member 21 is mounted on the laminator body 7 (or rear-stage conveyor 18) in an area between the thermo-compression roller 16 and a transport roller 18A in the rear-stage conveyor 18 as shown in FIGS. 1 and 2. This guide member 21 is so constructed that the substrate 11 over which the assembly 1B has been thermo-compression laminated will be guided from the laminating position to where the transport rollers 18A and 18B are positioned. The guide member 21 may be in an interdigital form of bars that extend in the direction of conveyance of the substrate 11 and which are arranged transversely to that direction of conveyance. The interdigital guide member 21 is capable of guiding the substrate 11 smoothly by reducing the area of contact and, hence, by reducing the frictional resistance with the substrate 11.

In the present invention, the substrate guide member 21 may be formed of a screen.

Alternatively, the member 21 be formed of a solid plate.

The method of laminating the assembly 1B by thermo-compression with the laminator of the embodiment being discussed is hereinafter described briefly with reference to FIGS. 1, 6 and 7 through 9 (enlarged view showing each of the essential steps).

In the first step, the leading edge of the assembly 1B which has been separated from the protective film 1A on the peeling roller 3 is manually positioned between the sub-vacuum plate 13 and the cutting unit 14.

Figure 8:
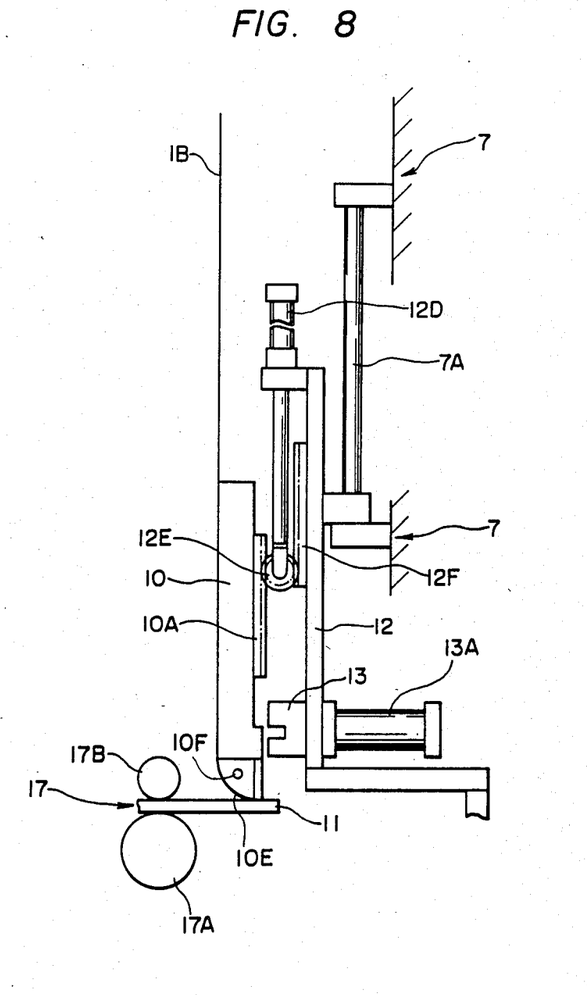

In the next step, the insulating substrate 11 is conveyed over transport rollers 17A and 17B in the front-stage conveyor 17. When the leading edge of the substrate 11 reaches the temporary bonding position, the leading edge of the assembly 1B is sucked onto the surface of the sub-vacuum plate 13. Thereafter, the drive source 13A is actuated to move the sub-vacuum plate 13 away from the pathway of the supply of assembly 1B so that the leading edge of the assembly will be sucked to the temporary bonding portion 10E as shown in FIG. 8. As it is sucked to the main vacuum plate 10 and the temporary bonding portion 10E, the assembly 1B undergoes adjustment by the thin film adjusting unit 19 so that the leading edge of the assembly can be readily sucked to the temporary bonding portion 10E. When the operation is continuous, the leading edge of the assembly 1B that has been cut with the cutting unit 14 is sucked to the temporary bonding portion 10E.

Subsequently, the drive source 12c is actuated to move the support member 12, so as to move the main vacuum plate 10 and the sub-vacuum plate 13 toward a direction near the insulating substrate 11. Simultaneous with the movement, the main vacuum plate 10 is further moved with respect to the support member 12 by means of the drive source 12D, so that leading end of the assembly 1B which is sucked by the temporary bonding portion 10E shown in FIG. 8 is temporarily bonded (temporalily thermo-compressed) to the conductive layer on the insulating substrate 11.

Figure 9:
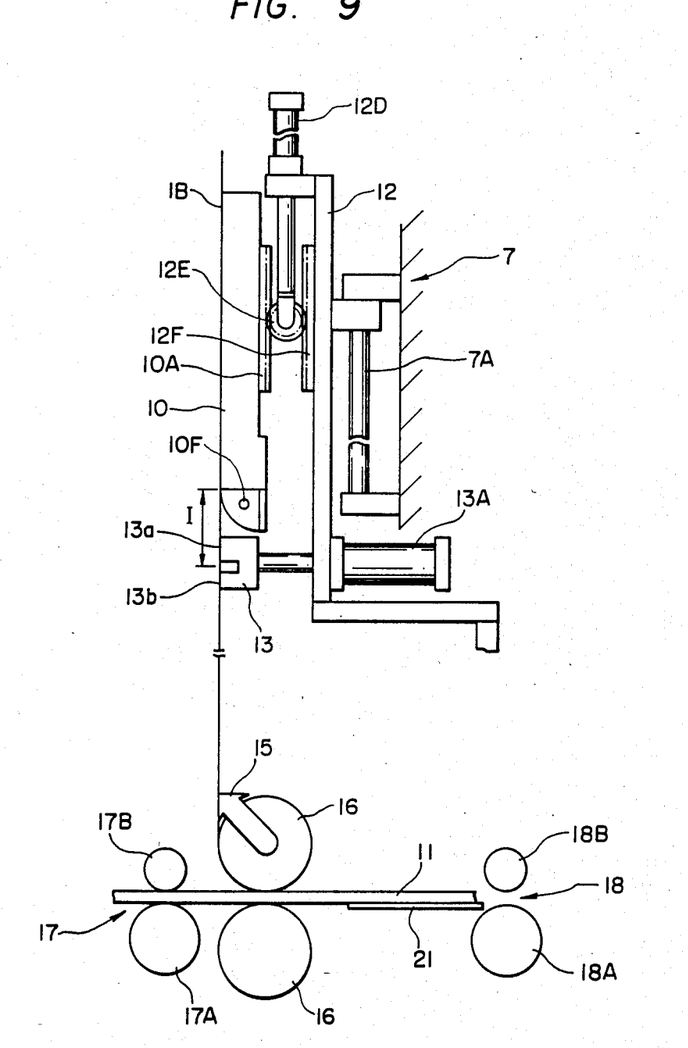

After the assembly 1B has been temporarily bonded to the substrate 11, the operation of sucking by the main vacuum plate 10 and temporary bonding portion 10E is turned off and the drive source 12C and 12D (FIG. 1) are actuated to cause each of the main vacuum plate 10, temporary bonding portion 10E and the sub-vacuum plate 13 to move away from the temporary bonding position as shown in FIG. 9.

Figure 7:
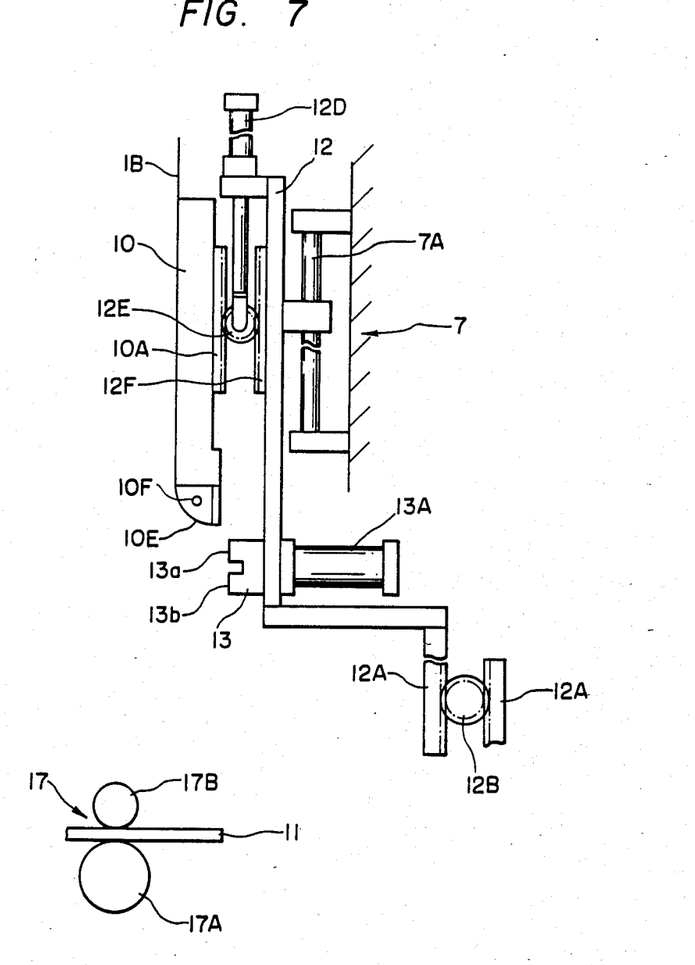
FIGS. 7 through 9 are enlarged illustrations showing essential portion of FIG. 1 in each steps of thermo-compression lamination method.

This movement away from the temporary bonding position is much larger than the movement during the step in which the assembly 1B is sucked to the temporary bonding portion 10E as shown in FIG. 7, and the movement being made by the drive source 12C to move the main vacuum plate 10 and the sub-vacuum plate 13. This moving length I in FIG. 9 is proportional to the slacking amount of the assembly 1B'. In this case, the drive source 12C of the support member 12 can be made compact in size or the drive source 12C can provide increased drive power to perform high speed operation, since the cutting unit 14 is fixed in the laminator body 7 as described above.

In a subsequent step, the thermo-compression rollers 16 are shifted from the position indicated by the dashed line 16' to the temporary bonding position indicated by the solid line. As the rollers 16 are rotated over both sides of the insulating substrate 11 with the leading edge of the assembly 1B being temporarily bonded thereto, said assembly is thermo-compression laminated to the conductive layer of the substrate 11. In this step, the operation of sucking by the main vacuum plate 10, temporary bonding portion 10E, and sub-vacuum plate 10, temporary bonding portion 10E, and sub-vacuum plate 13 is all turned off, so that each of the thermo-compression rollers 16 will be automatically supplied with the assembly 1B from the feed roller 2 by the rotating force of rollers 16 and the retaining force provided by the rollers 16 and the substrate 11.

When a given amount of assembly 1B has been laminated on the substrate 11 by thermo-compression, the action of sucking by the main vacuum plate 10, sub-vacuum plate 13 and rotary vacuum plate 15 i started substantially simultaneously. The support member 12 is moved by the drive source 12C from a position shown in FIG. 10, and the assembly 1B is supplied to the insulating substrate 11 by the main vacuum plate 10, and at the same time, the trailing end (cutting position) of the assembly 1B is brought into alignment with the cutting position of the cutter unit 14 by means of the lower vacuum portion 13b of the sub-vacuum plate 13. The supply speed of the assembly 1B (moving speed of the support member 12) is so set as to be faster than the speed at which it is thermo-compression laminated over the substrate 11 by rollers 16 (or the peripheral speed of the rollers 16).

In the present invention, the main vacuum plate 10 and the sub-vacuum plate 13 are mounted to the support member 12, and the support member 12 is disposed in the laminator body 7 in such a manner that the support member moves toward and away from the insulating substrate 11. Therefore, trailing end (cutting position) of the assembly 1B is sucked to the sub-vacuum plate 13 simultaneous with the sucking operation of the main vacuum plate 10, and the main vacuum plate 10 and the sub-vacuum plate 13 are moved by the support member 12 so as to align the cutting position of the assembly 1B with the cutting position of the cutter unit 14. As a result, no surplus slack is generated in the assembly 1B between the main vacuum plate 10 and the sub-vacuum plate 13. That is, the distance I defined between the main vacuum plate 10 and the position to which the disc like cutter 14C of the sub-vacuum plate 13 is applied (U-shaped portion) shown in FIG. 9 is not changed even in the state where the cutting position of the assembly 1B is in alignment with the cutting position of the cutter unit 14 as shown in FIG. 2. Therefore, the cutting position of the assembly 1B is correctly aligned with the cutting position of the cutter unit 14, and the assembly 1B can be cut to a precise dimension corresponding to the dimension of insulating substrate 11. Accordingly, precise thermo-compression lamination is effected to thus provide high yieldability. Moreover, the support member 12 provided with the main vacuum plate 10 and the sub-vacuum plate 13 can be driven by the drive source having small driving capacity, since the cutting unit 14 is fixed to the laminator body 7.

After the supply of the assembly 1B and alignment of its cutting position with the cutting position of the cutter unit 14, a slack assembly 1B' can be formed between the sub-vacuum plate 10 and the rotary vacuum plate 15. The trailing and leading edges of the slack assembly 1B' as seen in the direction of its supply are adjusted by the thin film adjusting unit 20 in such a manner that they are reliably sucked onto the lower sucking portion 13b of the sub-vacuum plate 13 and the rotary vacuum plate 15, respectively.

While it is held in this state, the assembly 1B is cut at its trailing edge (cutting position) with the cutter unit 14 to provide a segment of a predetermined size that corresponds to the size of the substrate 11.

Subsequently, the trailing edge of the so cut assembly 1B is sucked by the rotary vacuum plate 15, which then rotates at a speed slightly slower than that of the thermo-compression roller 16 and imparts an appropriate amount of tension to that part of the thin film which is defined by the area where it is laminated by rollers 16 and its trailing edge. As a result, the trailing edge of the assembly 1B can be laminate onto the conductive layer on the insulating substrate 11 without developing any surfabe defects such as wrinkles.

After the assembly 1B has been laminated by thermo-compression, the substrate 11 is conveyed, without any troubles, past the substrate guide member 21 to be carried through the transport rollers 18A and 18B in the rear-stage conveyor 18 by the rotating force of the thermo-compression rollers 16. The substrate 11 is further transferred from the rear-stage conveyor 18 to an adjacent exposure unit.

While the present invention has been described above in detail with reference to a specific embodiment, it should be understood that this is not the only embodiment of the invention and that various modifications can be made without departing from the spirit and scope of the present invention.

For instance, it is possible to the cutting unit 14 in the same direction as the feeding direction of the assembly 1B and to cut the assembly 1B while moving the cutting unit 14. The sub-vacuum plate 13 may be composed of two independently controlled plates, one plate being used to have leading edge of the assembly 1B (as seen in the direction of its supply) sucked to the temporary bonding portion 10E, and the other plate being used as a holder of the cutting unit 14.

In another application of the laminator of the present invention, the substrate 11 is preheated in preparation for the lamination of the assembly 1B over the substrate with unheated compression rollers.

The laminator of the present invention can also be employed in attaching a protective film to the surface of a decorative laminated sheet used as a construction material.

According to the invention, in a laminator, a cutter unit is provided so that a cutter is moved across the direction of feed of a continuous thin film to cut off the film to a prescribed size; and the film cut off by the cutter unit is laminated on a substrate. A shock absorber for absorbing a shock which takes place when the movement of said cutter of the cutter unit is stopped is provided at a prescribed portion near the stopped position of the cutter or near the prescribed portion of the body of said laminator. Therefore, it is possible to reduce the vibration of the cutting means and the laminator. This makes it possible to increase the cutting speed, which leads to high production yieldability.

We claim:

1. A laminator having a cutter unit for cutting a thin film to be laminated to a substrate, said cutter unit comprising:
    a guide member (14A) extending across the direction of feed of the continuous thin film;
    a moving member (14B) slidably disposed on said guide member (14A) so as to be movable therealong;
    a disk-shaped cutter (14C) provided on said moving member (14B);
    a hollow tube (14D) fixedly connected to said laminator and extending parallel to said guide member (14A);
    a slider (14E) connected to said moving member (14B) and slidably disposed in said tube (14D) in a sealed manner; and
    a drive means for driving said slider (14E) in said tube (14D) for attendantly driving said cutter across the direction of feed of the thin film.

2. A laminator according to the claim 1, characterized in that the disk-shaped cutter of the cutter unit is coated with a fluorine resin at and near the cutting edge of said cutter.

3. The laminator of claim 1, further comprising a shock absorber (22) for absorbing a shock which takes place when the movement of said cutter unit is stopped.

4. The laminator of claim 1, further comprising a rack (14J) disposed in parallel relation with respect to said guide member (14A) and wherein said moving member is provided with a pinion engaged with said rack to rotate said disk-shaped cutter.

5. The laminator according to claim 1, wherein said drive means is a hydraulic actuator for actuating linear movement of said slider in said tube.

* * * * *